United States Patent
Itoh

(10) Patent No.: US 6,669,002 B2
(45) Date of Patent: Dec. 30, 2003

(54) SPECIMEN-CONVEYING CONVEYER

(76) Inventor: Teruaki Itoh, 5-25, Kokaihommachi, Kumamoto-shi, Kumamoto-ken (JP)

(*) Notice: Subject to any disclaimer, the term of this patent is extended or adjusted under 35 U.S.C. 154(b) by 34 days.

(21) Appl. No.: 10/056,023

(22) Filed: Jan. 28, 2002

(65) Prior Publication Data

US 2002/0104738 A1 Aug. 8, 2002

(30) Foreign Application Priority Data

Feb. 8, 2001 (JP) ........................................ 2001-032727

(51) Int. Cl.⁷ .............................................. B65G 47/24
(52) U.S. Cl. .................................. 198/397.06; 198/624
(58) Field of Search ................................ 198/608, 624, 198/375, 397.03, 397.06

(56) References Cited

U.S. PATENT DOCUMENTS

| 2,790,532 A | * | 4/1957 | Albertoli | 198/397.06 X |
| 2,832,457 A | * | 4/1958 | Randles | 198/397.06 X |
| 3,148,762 A | * | 9/1964 | Gleason | 198/397.06 X |

FOREIGN PATENT DOCUMENTS

| JP | 54-62283 | 5/1979 |
| JP | 6-183542 | 7/1994 |
| JP | 11-258247 | 9/1999 |

OTHER PUBLICATIONS

Japanese Official Action dated Jan. 7, 2003 for Appln. No. 2001–032727 (and translation thereof).

* cited by examiner

Primary Examiner—James R. Bidwell
(74) Attorney, Agent, or Firm—Nixon & Vanderhye P.C.

(57) ABSTRACT

A specimen-conveying conveyor includes a holding roller mechanism including a roller unit having a plurality of holding rollers, which are arranged in a horizontal direction so as to form a valley region in which a test tube is laid down and held, along a conveyance path, a rotation driving mechanism which simultaneously rotates the holding rollers of the roller unit of the holding roller mechanism in a first direction and thus rotates the test tube laid down and held in the valley region in a second direction opposite to the first direction, and a slide driving mechanism which slides the test tube laid down and held in the valley region in a direction along an axis of each of the holding rollers.

6 Claims, 4 Drawing Sheets

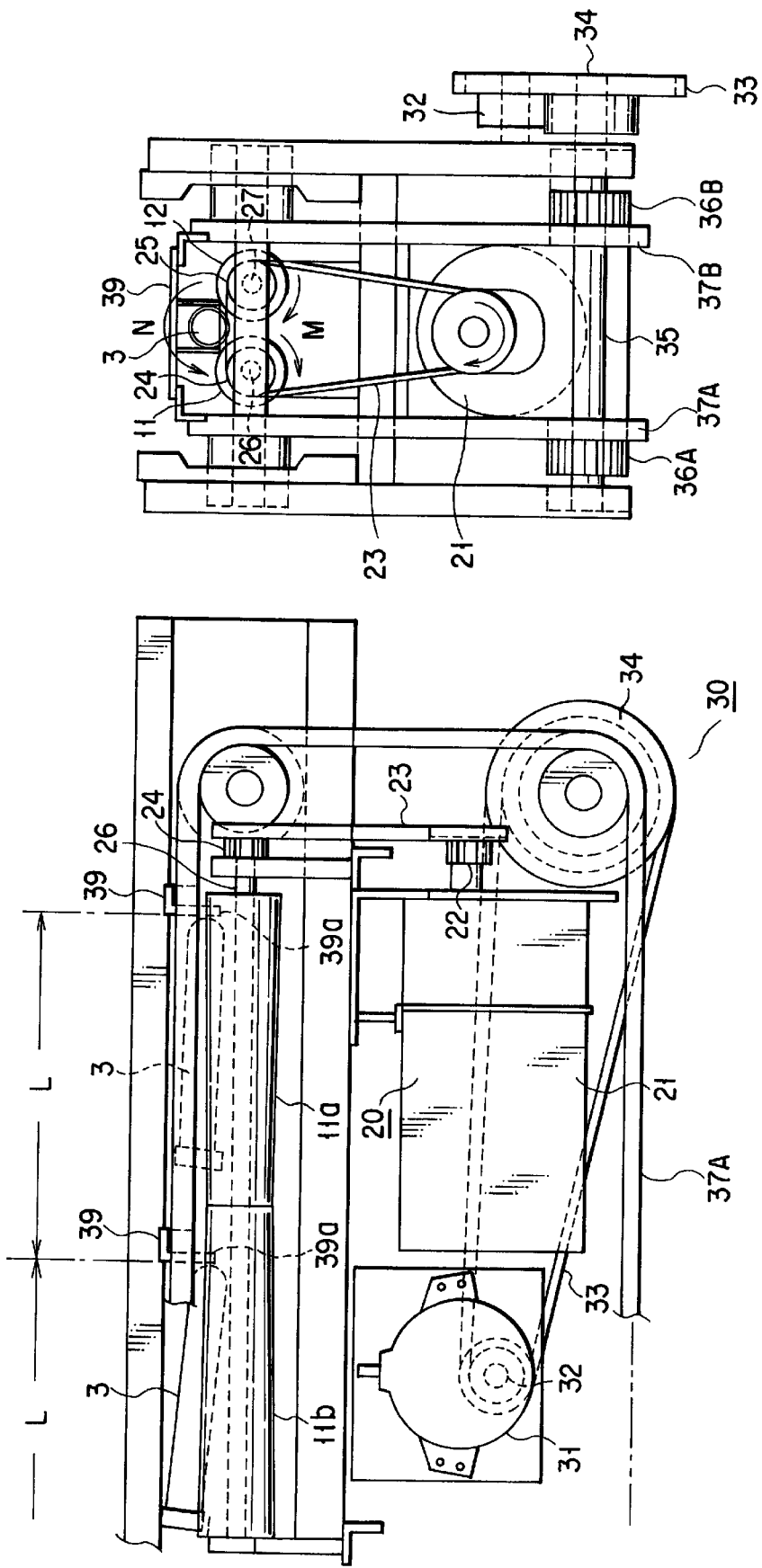

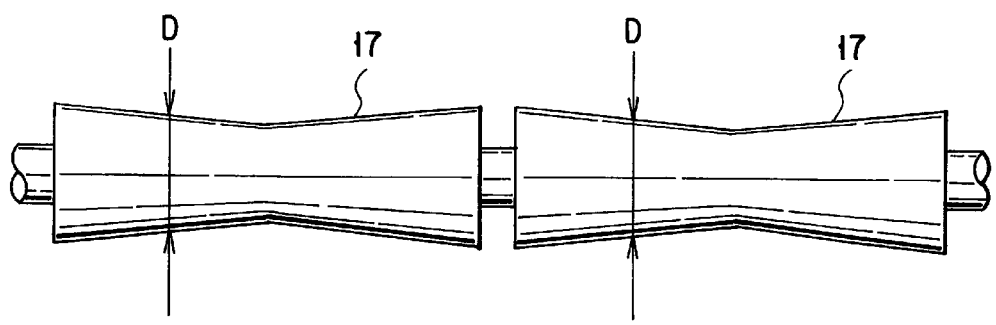
FIG. 4
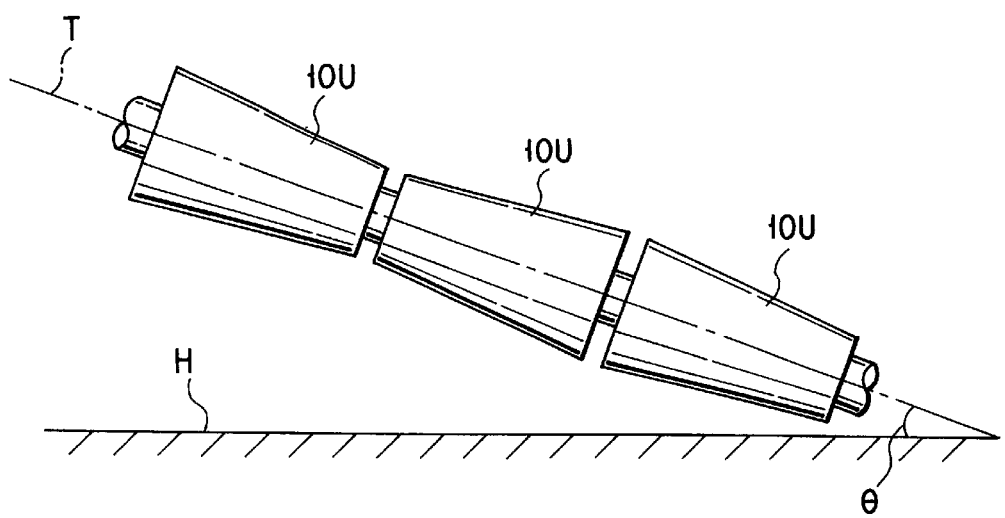
FIG. 5
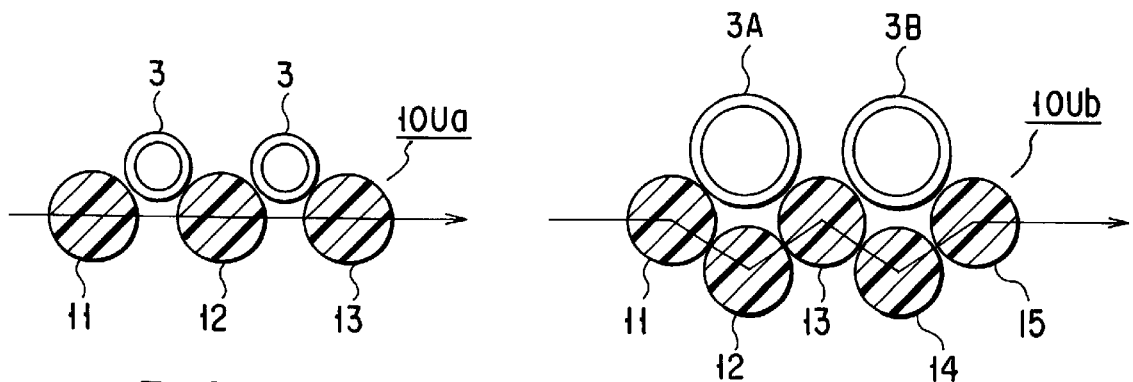
FIG. 6
FIG. 7

SPECIMEN-CONVEYING CONVEYER

CROSS-REFERENCE TO RELATED APPLICATIONS

This application is based upon and claims the benefit of priority from the prior Japanese Patent Application No. 2001-032727, filed Feb. 8, 2001, the entire contents of which are incorporated herein by reference.

BACKGROUND OF THE INVENTION

1. Field of the Invention

The present invention relates to a specimen-conveying conveyor for conveying a specimen such as blood.

2. Description of the Related Art

If blood drawn for a blood test is left in a blood-drawing tube, it will be coagulated. In order to prevent this, usually, an anticoagulant is put into the blood-drawing tube in advance and the blood (specimen) is agitated together with the anticoagulant in the tube.

In a prior art means for agitating the blood and the anticoagulant, an operator agitated blood in a blood-drawing tube together with an anticoagulant, using an agitator or by someone's hand before or after he or she conveyed the tube to a target place. Since the agitation is very complicated and unstable, it is likely to be operated insufficiently. Moreover, operation time to agitate the specimen and anticoagulant has to be secured separately from time to convey the specimen to a target place. Thus, the prior art agitating means had a problem that an operation in a subsequent step could not be started quickly.

BRIEF SUMMARY OF THE INVENTION

An object of the present invention is to provide a specimen-conveying conveyor having the following advantages:

1) Agitation of a specimen and an anticoagulant is not complicated but very simplified. Further, necessary and sufficient agitation can be performed with stability.
2) Any special time for agitation need not be secured and a subsequent operation can be started quickly. The total specimen processing time can thus be shortened.
3) Agitation conditions can be controlled appropriately in accordance with the length of a conveyance path.

In order to attain the above object, the specimen-conveying conveyor according to the present invention has the following characteristic configuration. The other characteristic configurations will be clarified in the Embodiment later.

A specimen-conveying conveyor according to an aspect of the present invention comprises a holding roller mechanism including a roller unit having a plurality of holding rollers, which are arranged in a horizontal direction so as to form a valley region in which a test tube is laid down and held, along a conveyance path, a rotation driving mechanism which simultaneously rotates the holding rollers of the roller unit of the holding roller mechanism in a first direction and thus rotates the test tube laid down and held in the valley region in a second direction opposite to the first direction, and a slide driving mechanism which slides the test tube laid down and held in the valley region in a direction along an axis of each of the holding rollers.

In the foregoing specimen-conveying conveyor, the agitation of a specimen and an anticoagulant due to the rotation of the test tube can automatically be performed in the specimen conveying process. Thus, an operator need not perform a complicated agitating operation artificially but can perform necessary and sufficient agitation with stability. Since the agitation is performed during the conveyance of a specimen, any special time for the agitation need not be secured. The operator can start his or her subsequent operation quickly and shorten the total specimen processing time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a side view showing a configuration of a driving mechanism section of the specimen-conveying conveyor according to the embodiment of the present invention.

FIG. 2B is an end view showing a configuration of a conveyance starting end of the driving mechanism section of the specimen-conveying conveyor according to the embodiment of the present invention.

FIGS. 4 to 7 show modifications of a roller unit according to the embodiment of the present invention.

DETAILED DESCRIPTION OF THE INVENTION

Embodiment

[Configuration]

Figure 1A:
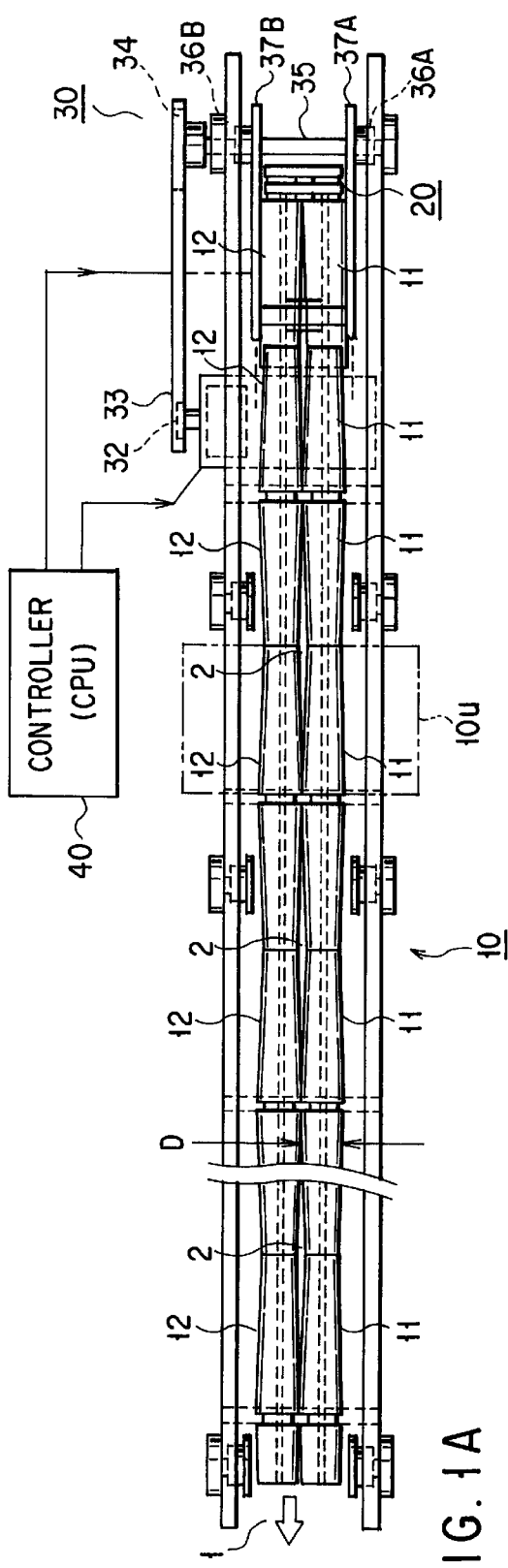
FIG. 1A is a top view showing a configuration of a specimen-conveying conveyor according to an embodiment of the present invention.
Figure 1B:
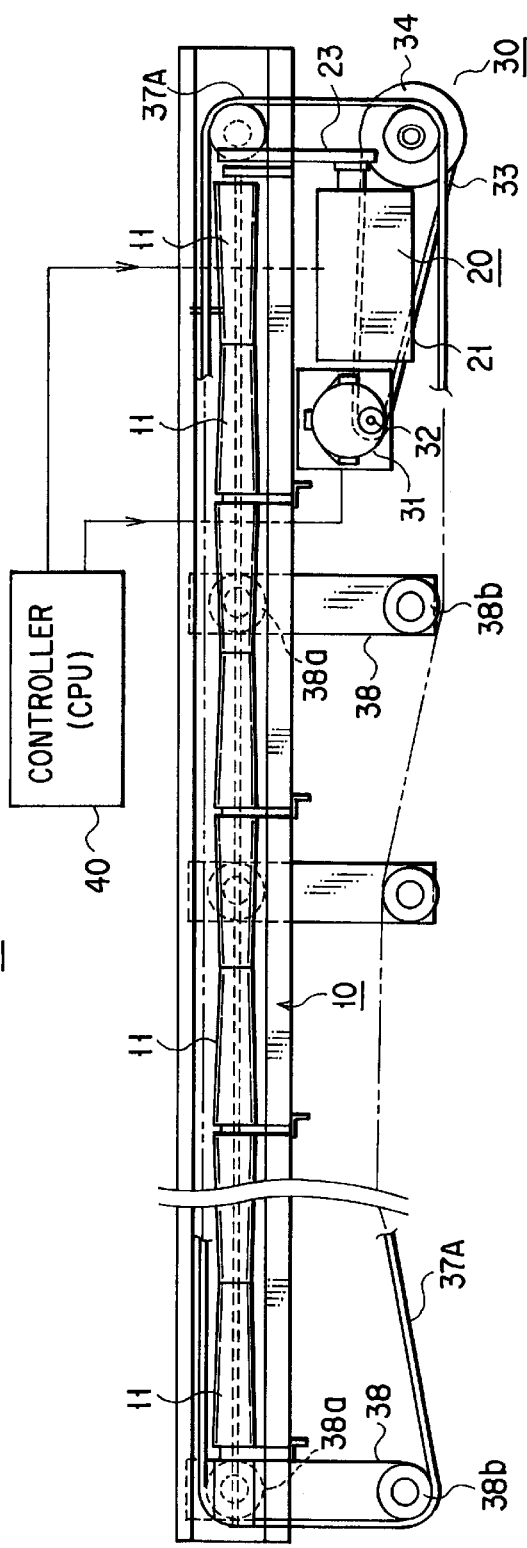
FIG. 1B is a side view showing a configuration of the specimen-conveying conveyor according to the embodiment of the present invention.

As illustrated in FIGS. 1A and 1B, a specimen-conveying conveyor according to an embodiment of the present invention comprises a holding roller mechanism 10, a rotation driving mechanism 20, a slide driving mechanism 30, and a controller 40.

The holding roller mechanism 10 includes a plurality of roller units 10U that are coupled to each other so as to form valley regions 2 along a conveyance path 1. The roller units 10U include pairs of holding rollers 11 and 12 arranged in a horizontal direction. In the present embodiment, the pairs of holding rollers 11 and 12 are arranged in parallel on the horizontal surface. In the holding roller mechanism 10, therefore, a test tube 3 containing a specimen and an anticoagulant can be laid down and held in the valley regions 2.

As shown in FIGS. 1A and 1B, the pair of holding rollers 11 and 12 is varied gradually in outside diameter D along the axis thereof. The direction in the variation is set such that the outside diameter D alternately increases and decreases for each of the roller units 10U.

As illustrated in FIGS. 2A and 2B, the rotation driving mechanism 20 transmits a turning force of a driving motor 21 to shafts 26 and 27, which are common to each pair of holding rollers 11 and 12 in the holding roller mechanism 10, through a gear 22, an endless chain 23, and gears 24 and 25. All the holding rollers 11 and 12 rotate simultaneously in a first direction M as shown in FIG. 2B. Consequently, the test tube 3, which is laid and held in the valley regions 2, rotates in a second direction N.

As shown in FIGS. 2A and 2B, the slide driving mechanism 30 transmits a turning force of a driving motor 31 to a pair of conveying endless chains 37A and 37B, which are provided on both sides of the conveyor, through a gear 32, an endless chain 33, a gear 34, a driving shaft 35, and a pair of gears 36A and 36B.

As shown in FIGS. 1A and 1B, the conveying endless chains 37A and 37B are guided by a guide mechanism 38 having guide gears 38a and 38b up and down and can circulate along the conveyance path 1. As shown in FIGS. 2A and 2B, the conveying endless chains 37A and 37B have a plurality of slide operation members 39 that are arranged at regular intervals L along the conveyance path 1. Each of the slide operation members 39 is shaped almost like a strip and has an operating projection 39a in the central part thereof. The operating projection 39a is used to convey the test tube 3 in contact with the bottom of the test tube 3. Both ends of each slide operation member 39 are attached to the conveying endless chains 37A and 37B by means of mounting members, with the result that all the slide operation members 39 are supported horizontally.

The plurality of slide operation members 39 move in accordance with the movement of the conveying endless chains 37A and 37B. Thus, the bottoms of a plurality of test tubes 3 each containing a specimen and an anticoagulant, which are laid and held in the valley regions 2 of the holding roller mechanism 10, are pressed by their respective operating projections 39a that are located close to the bottoms of the test tubes 3. Consequently, the test tubes 3 are slid together in a direction along the axis of each of the holding rollers 11 and 12 and conveyed to a target place.

As illustrated in FIGS. 1A and 1B, the specimen-conveying conveyor according to the present embodiment comprises a controller 40 that is made of a CPU. The controller 40 controls forward/backward operation directions and speeds of the rotation driving mechanism 20 and slide driving mechanism 30 independently or in association with each other.

In other words, the controller 40 controls the direction and speed of rotation of the test tubes 3 by controlling the direction and speed of rotation of the holding rollers 11 and 12 by the rotation driving mechanism 20. The controller 40 also controls the direction and speed of conveyance of the test tubes 3 by controlling the direction and speed of movement of the conveying endless chains 37A and 37B or the direction and speed of movement of the slide operation members 39 by the slide driving mechanism 30.

[Operation]

The test tube 3 containing the drawn blood and its anticoagulant is fed to the conveyance starting end of the conveyor that is controlled in a given operation state by the controller 40. The test tube 3 is thus laid down and held in the valley region 2 of the holding rollers 11 and 12 of the first roller unit 10U and starts to rotate in the direction N on the holding rollers 11 and 12 that is being rotated at a predetermined speed in the direction M by the rotation driving mechanism 20. Simultaneously, the test tube 3 is slid in the valley regions 2 in a direction along the axis of each of the holding rollers 11 and 12 by means of the operating projection 39a of the slide operation member 39 that moves in accordance with the conveying endless chains 37A and 37B circulated by the slide driving mechanism 30. The test tube 3 is thus conveyed in order in the valley regions 2 of the plurality of coupled roller units 10U to a target place while being rotated by itself.

Figure 3A:
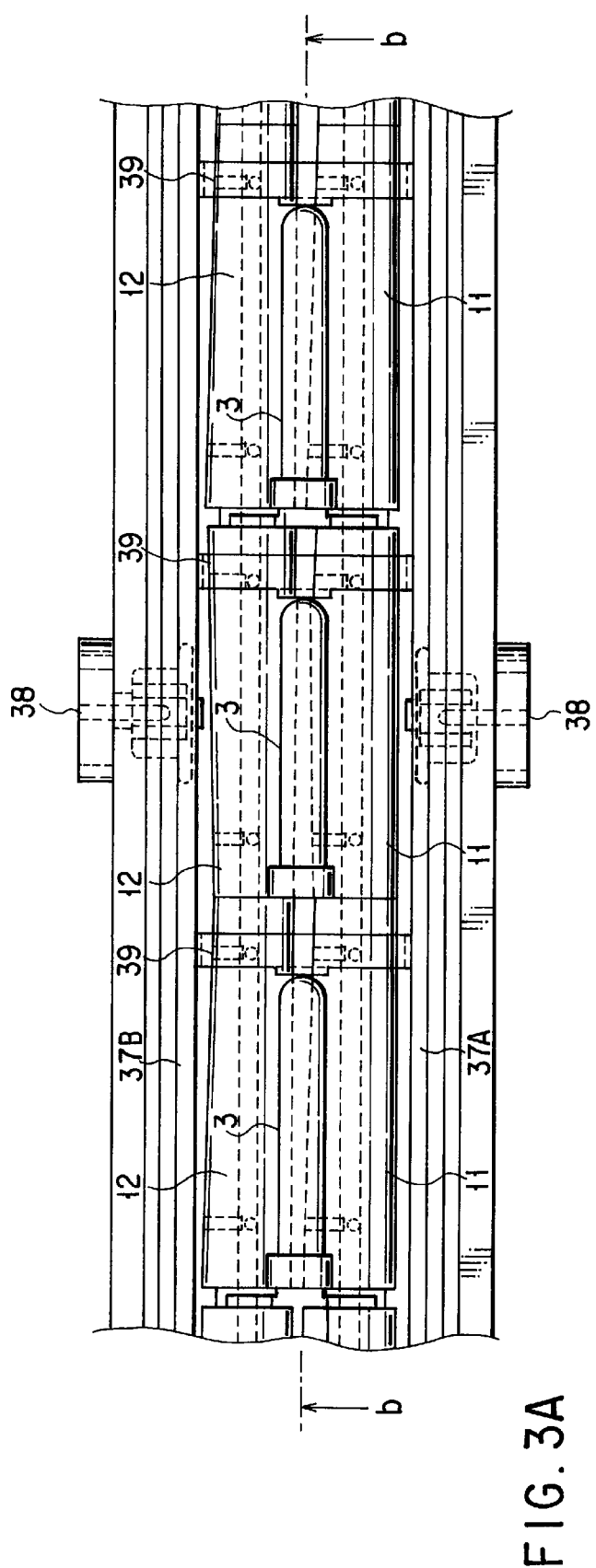
FIG. 3A is a partial top view for explaining an operation of the specimen-conveying conveyor according to the embodiment of the present invention.
Figure 3B:
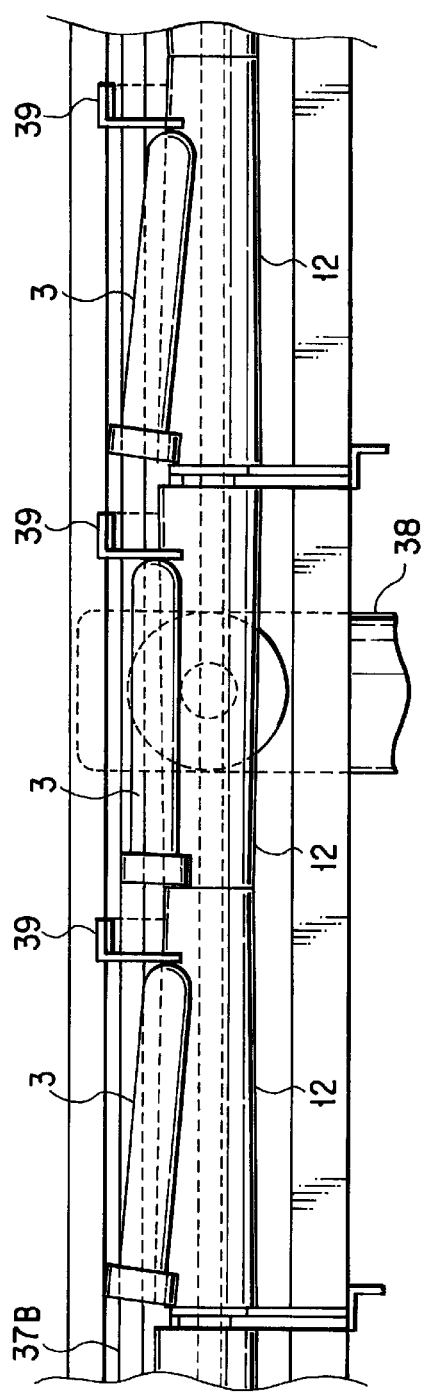
FIG. 3B is a partially sectional side view taken along line b—b of FIG. 3A.

FIGS. 3A and 3B illustrate a state in which a plurality of test tubes 3 are conveyed in sequence from the conveyance starting end of the conveyor. When the test tubes 3 move in order in the valley regions 2 of the plurality of roller units 10U, both the head and bottom of each test tube are repeatedly vibrated vertically as illustrated in FIG. 3B. In other words, the valley regions 2 are deepened and shallowed as the holding rollers 11 and 12 of the respective roller units 10U vary in outside diameter D. The test tubes 3 thus slide and move in order in the valley regions 2 while being continuously vibrated up and down as if they went over the waves that are washed continuously. As a result, the blood and anticoagulant contained in the test tubes are agitated very efficiently by a complicated movement of both rotation and vibration of the test tubes 3.

Since the controller 40 controls the forward/backward operation directions and speeds of the rotation driving mechanism 20 and slide driving mechanism 30 independently or in association with each other, more different agitation conditions (methods of agitation) can be set. In other words, the direction and speed of rotation of the test tubes 3 can arbitrarily be controlled by controlling the direction and speed of rotation of the holding rollers 11 and 12 by the rotation driving mechanism 20. Further, the direction and speed of conveyance of the test tubes 3 can be controlled in a desired state by controlling the direction and speed of movement of the conveying endless chains 37A and 37B or the direction and speed of movement of the slide operation member 39 by the slide driving mechanism. If, therefore, these controls are combined appropriately, a variety of agitation conditions (method of agitation) can be set.

Features of the Embodiment

[1] A specimen-conveying conveyor according to the embodiment comprises:

a holding roller mechanism 10 including a roller unit 10U having a plurality of holding rollers (11 and 12), which are arranged in a horizontal direction so as to form a valley region 2 in which a test tube 3 is laid down and held, along a conveyance path 1;

a rotation driving mechanism 20 which simultaneously rotates the holding rollers 11 and 12 of the roller unit 10U of the holding roller mechanism 10 in a first direction M and thus rotates the test tube 3 laid down and held in the valley region 2 in a second direction N opposite to the first direction M; and a slide driving mechanism 30 which slides the test tube 3 laid down and held in the valley region 2 in a direction along an axis of each of the holding rollers 11 and 12.

In the foregoing specimen-conveying conveyor, the agitation of a specimen and an anticoagulant due to the rotation of the test tube 3 can automatically be performed in the specimen conveying process. Thus, an operator need not perform a complicated agitating operation artificially but can perform necessary and sufficient agitation with stability. Since the agitation is performed during the conveyance of a specimen, any special time for the agitation need not be secured. The operator can start his or her subsequent operation quickly and shorten the total specimen processing time.

[2] In the specimen-conveying conveyor according to the above paragraph [1], the holding roller mechanism 10 includes a plurality of roller units 10U coupled to each other along the conveyance path 1.

In the above specimen-conveying conveyor, the length of the conveyor can be adjusted relatively easily in accordance with the length of the conveyance path 1 by increasing and decreasing the number of roller units 10U.

[3] In the specimen-conveying conveyor according to one of the above paragraphs [1] and [2], an outside diameter D of each of the holding rollers 11 and 12 is set so as to alternately increase and decrease gradually along an axis of each of the rollers (including a gradual increase and decrease in one holding roller).

In the above specimen-conveying conveyor, the test tube 3 moves up and down as it slides along the axis of each of the holding rollers 11 and 12. The agitation of a specimen and an anticoagulant is performed with efficiency.

[4] In the specimen-conveying conveyor according to the above paragraph [2], an outside diameter D of each of the holding rollers 11 and 12 is set so as to alternately increase and decrease gradually for each of the roller units 10U along an axis of each of the rollers.

In the above specimen-conveying conveyor, all the rollers can be formed like a truncated cone, so that the conveyor can be manufactured simply and inexpensively.

[5] The specimen-conveying conveyor according to one of the above paragraphs [1] to [4], further comprises a controller 40 which controls forward/backward operation directions and speeds of the rotation driving mechanism 20 and the slide driving mechanism 30 independently or in association with each other.

The foregoing specimen-conveying conveyor can carry out the following operation. For example, the agitation conditions of a specimen and an anticoagulant can be optimized by properly varying a ratio of rotation speed to slide speed of the test tube 3. If only the rotation driving mechanism 20 is performed, the test tube 3 rotates in a fixed position on the conveyor, and agitation can be promoted on a short conveyor. If, further, only the slide driving mechanism 30 operates, the test tube 3 does not rotate at all but performs a slide operation only, thereby conveying the test tube 3 quickly. The rotation speed and slide speed of the test tube 3 can be controlled at once in association with each other while maintaining a fixed ratio between them. The rotating direction of the test tube 3 can be reversed at the appropriate times (e.g., alternately every time period) to improve the efficiency of agitation. When the need arises, the test tube 3 can be conveyed in an opposite direction at the appropriate times to extend the time of agitation.

Modifications

The specimen-conveying conveyor according to the embodiment can be modified as follows:

i) As shown in FIG. 4, the outside diameter D of each of holding rollers 17 increases and decreases gradually.

ii) As shown in FIG. 5, the plurality of roller units 10U are arranged on an inclined plane T that is inclined at a given angle θ toward the horizontal plane H.

iii) As illustrated in FIG. 6, a roller unit 10Ua includes two or more, for example, three holding rollers 11 to 13 that are arranged in line as indicated by the arrow.

iv) As illustrated in FIG. 7, a roller unit 10Ub includes two or more, for example, five holding rollers 11 to 15 that are arranged in zigzags in two lines in the horizontal direction as indicated by the arrow.

v) The present invention can be applied to the case where a specimen other than blood, such as urine combined with predetermined treatment stuff.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A specimen-conveying conveyor comprises:
a holding roller mechanism including a plurality of roller units having a plurality of holding rollers, which are arranged in a horizontal direction so as to form a valley region in which a test tube is laid down and held, along a conveyance path wherein the roller units are coupled to each other along the conveyance paths and an outside diameter of each of the holding rollers is set so as to alternately increase and decrease gradually along an axis of each of the rollers;
a rotation driving mechanism which simultaneously rotates the holding rollers of the roller unit of the holding roller mechanism in a first direction and thus rotates the test tube laid down and held in the valley region in a second direction opposite to the first direction; and
a slide driving mechanism which slides the test tube laid down and held in the valley region in a direction along an axis of each of the holding rollers.

2. The specimen-conveying conveyor according to claim 1, wherein an outside diameter of each of the holding rollers is set so as to alternately increase and decrease gradually along an axis of each of the rollers.

3. The specimen-conveying conveyor according to claim 1, wherein an outside diameter of each of the holding rollers is set so as to alternately increase and decrease gradually for each of the roller units along an axis of each of the rollers.

4. The specimen-conveying conveyor according to claim 1, further comprising a controller which controls forward/backward operation directions and speeds of the rotation driving mechanism and the slide driving mechanism independently or in association with each other.

5. The specimen-conveying conveyor according to claim 2, further comprising a controller which controls forward/backward operation directions and speeds of the rotation driving mechanism and the slide driving mechanism independently or in association with each other.

6. The specimen-conveying conveyor according to claim 3, further comprising a controller which controls forward/backward operation directions and speeds of the rotation driving mechanism and the slide driving mechanism independently or in association with each other.

* * * * *